(12) United States Patent
Tawa

(10) Patent No.: US 7,429,725 B2
(45) Date of Patent: Sep. 30, 2008

(54) OPTICAL ASSEMBLY WITH OPTICAL TRANSMITTING AND RECEIVING FUNCTIONS

(75) Inventor: Katsuhisa Tawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 27 days.

(21) Appl. No.: 11/413,003

(22) Filed: Apr. 28, 2006

(65) Prior Publication Data

US 2006/0261258 A1    Nov. 23, 2006

(30) Foreign Application Priority Data

May 2, 2005    (JP)    ............................. 2005-134353

(51) Int. Cl.
*H01J 3/14*    (2006.01)
(52) U.S. Cl. ...................................... 250/216; 250/239
(58) Field of Classification Search ................ 250/216, 250/214.1, 239, 551, 201.2, 201.5; 257/80–85, 257/432–437; 369/44.14–44.24
See application file for complete search history.

(56) References Cited

U.S. PATENT DOCUMENTS

| 4,767,171 | A  | * | 8/1988 | Keil et al. ...................... 385/35 |
| 6,236,669 | B1 |   | 5/2001 | Nakanishi |
| 6,556,608 | B1 |   | 4/2003 | Gilliland et al. |
| 6,925,256 | B1 | * | 8/2005 | Heiney ......................... 398/42 |

FOREIGN PATENT DOCUMENTS

| JP | 2004-271921 A | 9/2004 |
| JP | 2005-260223 A | 9/2005 |

* cited by examiner

*Primary Examiner*—Que T Le
(74) *Attorney, Agent, or Firm*—Venable, LLP; Michael A. Sartori; Justine Gozzi

(57) ABSTRACT

The present invention provides a low-cost optical assembly with both function of the optical transmission and the optical reception to the single fiber. The optical assembly provides both devices of the light-emitting and the light-receiving. The light-emitting device emits light with the first wavelength to the first direction, while, the light-receiving device provides an optical thin film that reflects the light with the first wavelength incident from the first direction to the second direction different from the first direction, while, transmits the light with the second wavelength that is incident from the second direction to a light-sensitive area formed within the light-receiving device.

15 Claims, 12 Drawing Sheets

OPTICAL ASSEMBLY WITH OPTICAL TRANSMITTING AND RECEIVING FUNCTIONS

BACKGROUND OF THE INVENTION

1. Field of the Invention

The present invention relates to an optical assembly, in particular, an optical assembly with transmitting and receiving functions.

2. Related Prior Art

One type of optical assemblies has a well-known configuration that emits the light with the first wavelength to an optical fiber and receives the light with the second wavelength from the same optical fiber, and such assembly is applied in the both directional optical communication. Conventional assembly with such functions provides a light-emitting device, first to third lenses, an optical filter, and a light-receiving device. Between the light-emitting device and the optical fiber is installed with the first lens, the optical filter, and the second lens in this order. The light with the first wavelength emitted from the light-emitting device is collimated by the first lens. The optical filter is configured to transmit the light with the first wavelength, and to reflect the light with the second wavelength. Thus, the light, emitted from the light-emitting device and transmitted through the optical filter, enters the second lens. The second lens concentrates this light onto the tip of the optical fiber.

On the other hand, the light with the second wavelength emitted from the tip of the optical fiber is collimated by the second lens, reflected by the optical filter, and enters the third lens. The third lens focuses this light with the second wavelength on the light-receiving device. Japanese patent application published as JP-2003-322768A has disclosed such optical assembly.

However, the configuration above is necessary to install three lenses and one optical filter. Accordingly, these optical elements are hard to be installed within a small sized package, especially within the so-called co-axial package. Moreover, the number of elements intrinsically causes the cost increase.

Therefore, the present invention is to provide an optical assembly having both functions of the optical transmission and the optical reception to the single fiber.

SUMMARY OF THE INVENTION

An optical assembly of the present invention provides a light-emitting device and a light-receiving device within a package. The light-emitting device emits light with the first wavelength to a first direction, while, the light-receiving device provides an optical thin film and a light-sensitive area. The optical thin film reflects the light incident from the light-emitting device to a second direction different from the first direction, and transmits light with the second wavelength that is incident from the second direction to the light-sensitive area that is formed within the light-receiving device. Thus, placing single optical fiber along the second direction, the present optical arrangement of the light-emitting device and the light-receiving device with the optical thin film, both functions of the optical transmission and the optical reception with respect to the single fiber may be realized.

The optical assembly may provide a one package with a stem for installing the light-emitting device and the light-receiving device. Two devices may be mounted on the stem via a bench with first and second surfaces. The first surface mounts the light-emitting device, while, the second surface mounts the light-receiving device thereon. In the present invention, the first surface may be in parallel to a primary surface of the stem to make the first direction, along which the light emitted from the light-emitting device propagates, parallel to the stem, while, the second surface of the bench may be inclined against the primary surface of the stem to make the second direction substantially perpendicular to the primary surface of the stem. This arrangement of the stem and the bench makes it possible to arrange the light-emitting device and the light-receiving device within the one package even when the light-emitting device is the so-called edge-emitting type.

The light-receiving device may provide an optical absorption film around an area, where the light incident from the light-emitting device is reflected and the light incident from the optical fiber is transmitted, to absorb light with wavelengths different from the first and second wavelengths to reduce stray light.

The optical assembly may provide a lens between the light-receiving device and the optical fiber to concentrate light reflected by the optical thin film on the tip of the optical fiber and light emitted from the tip of the optical fiber on the optical thin film. At least one surface of the lens, the surface facing the optical thin film or the surface facing the optical fiber, may provide an anti-reflection coating to reduce stray light.

The light-receiving device may provide another light-sensitive area to receive light with the first wavelength leaked through the optical thin film, which enables to monitor a portion of the light with the first wavelength to control the optical output power thereof.

DESCRIPTION OF PREFERRED EMBODIMENTS

Next, preferred embodiments will be described. In the specification and drawings, the same symbols or numerals will refer to the same elements without overlapping description.

First Embodiment

Figure 1:
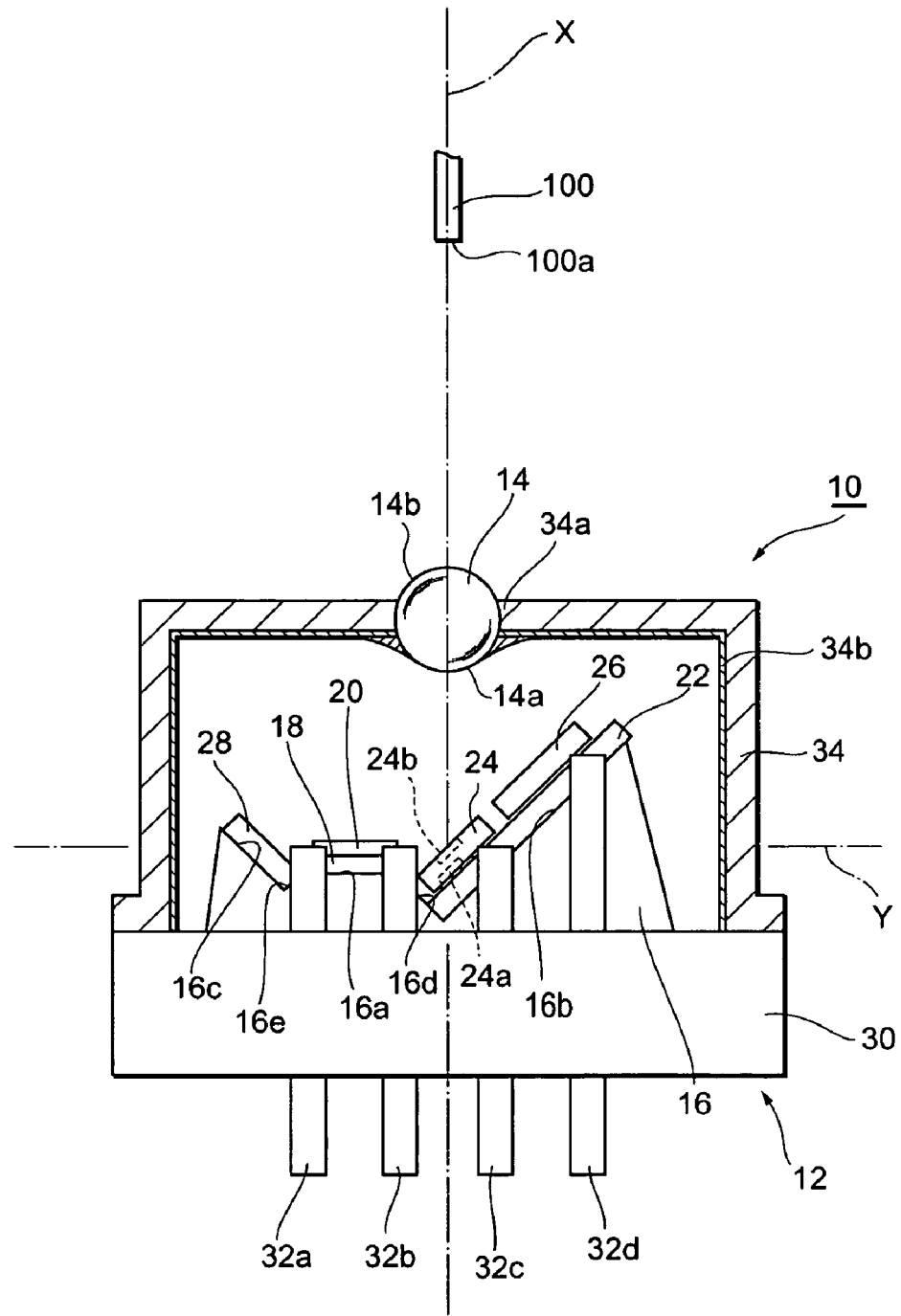
FIG. 1 is a side view of the optical assembly according to the first embodiment of the present invention.
Figure 2:
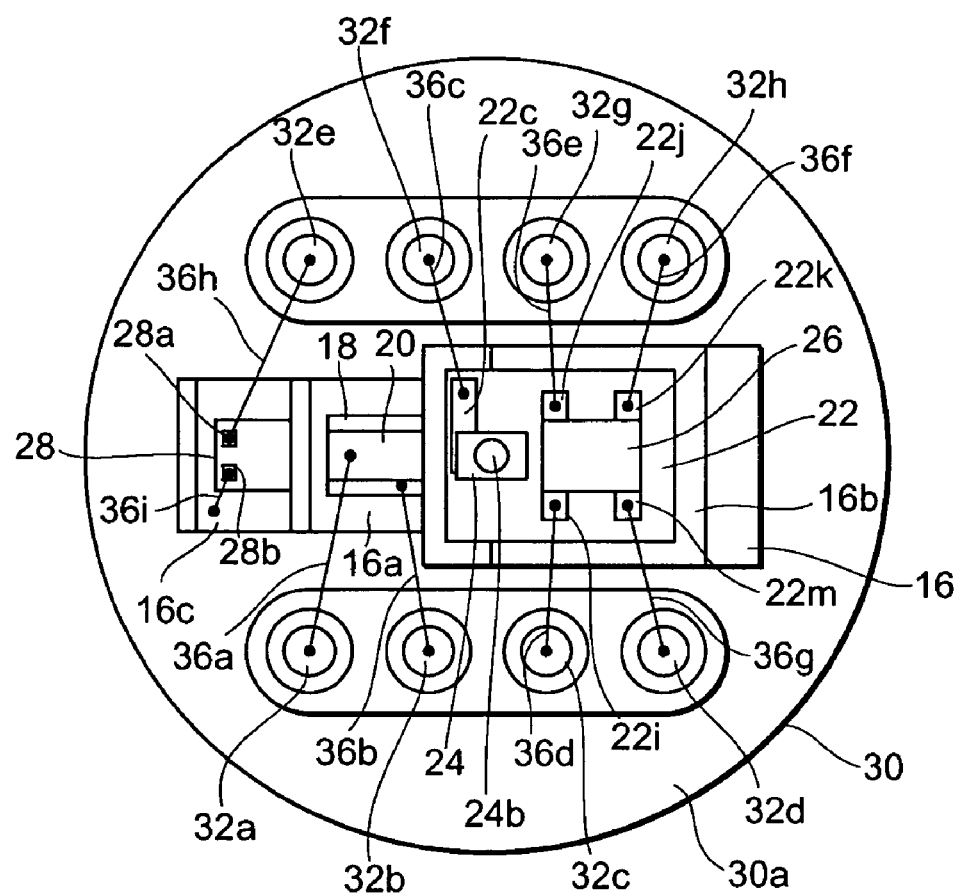
FIG. 2 is a plan view of the optical assembly shown in FIG. 1.

FIG. 1 is a partially broken side view of an optical assembly according to the first embodiment of the present invention, and FIG. 2 is a plan view of the optical assembly of the first embodiment in a state omitting a lens cap.

The optical assembly 10 shown in FIG. 1 applied in the bi-directional optical communication such that the assembly 10 outputs light having a first wavelength into a tip 100a of an optical fiber 100, while, receives light having a second wavelength from the tip 100a thereof. The optical assembly 10 comprises a housing 12, a lens 14, a bench 16, a carrier 18, a light-emitting device, a sub-mount 22, a first light-receiving device 24, a pre-amplifier, and a second light-receiving device 28.

The housing 12 includes a stem 30, a plurality of lead terminals, 32a to 32h, and a lens cap 34. The stem 30 has a disk shape with a primary surface 30a intersecting an axis X. The stem also provides a plurality of through holes extending along the axis X, into which the lead terminals, 32a to 32h, are inserted with a sealant, such as low-melting glass, filling a gap between the lead terminals, 32a to 32h, and the stem 30 to electrically isolate therebetween. The lens cap 34 is a cylindrical member with one end thereof fixed to the primary surface 30a, while, the other end, a ceiling with respect to the stem 30, securing the lens 14 in a portion passing the axis X. The lens 14 in the first thereof 14a optically couples with the first light-receiving device 24. The second surface 14b of the lens 14 couples with the tip 100a of the optical fiber 100. The lens 14 is secured by the lens cap 34 with the sealant, such as low-melting glass, filled by a gap between the ceiling 34a of the lens cap 34 and the lens 14. An inner surface of the lens cap 34 forms an anti-reflection coating 34b to absorb the stray light within the housing 12. The anti-reflection coating 34b may be made of epoxy resin containing carbon.

The primary surface 30a of the stem 30 mounts the bench 16 that provides first to third surfaces, 16a to 16c. The first surface 16a, which extends along a plane intersecting the axis X, mounts the light-emitting device 20 via the carrier 18. This light-emitting device 20 emits light with the first wavelength, and may be a semiconductor laser diode emitting the light of 1310 nm wavelength. The light-emitting device 20 provides a first facet 20a for emitting the light intersecting a second axis Y and a second facet 20b opposite to the first facet. Here, the axis Y intersects the axis X. The upper electrode of the light-emitting device is electrically connected to the lead terminal 32a with a bonding wire 36a, while the lower electrode thereof is electrically connected to the lead terminal 32b via the conductive carrier 18 and a bonding wire 36b. These bonding wires, 36a and 36b, extend along a direction intersecting the axis X and the axis Y.

The second surface 16b, extends along a plane intersecting the axis X and the axis Y, faces the first facet 20a of the light-emitting device 20. The second surface 16b mounts the sub-mount 22 that places the first light-receiving device 24 and the pre-amplifier 26. The bench 16 further provides a fourth surface 16d between the first 16a and second 16b surfaces, which intersects the second surface 16b. This fourth surface 16d facilitates the alignment between the light-emitting device 20 and the light-receiving device 24 by abutting the sub-mount 22 against the fourth surface 16d.

Figure 3:
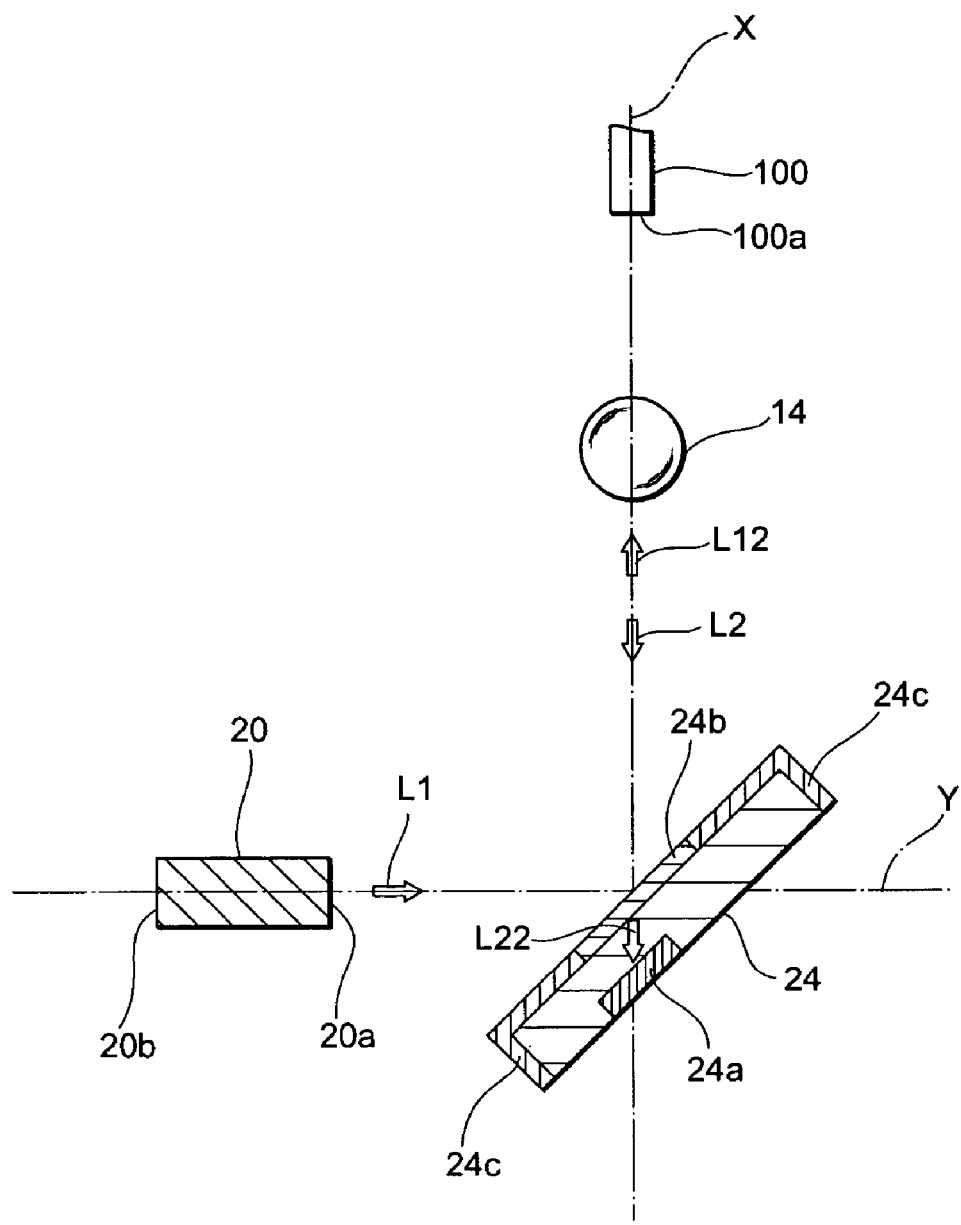
FIG. 3 schematically shows an optical arrangement of the light-emitting device, the light-receiving device, the lens, and the optical fiber according to the first embodiment of the invention.

FIG. 3 schematically illustrates the positional relation of the light-emitting device 20, the light-receiving device 24, and the lens 14. As acknowledged in FIG. 3, the light-receiving device 24 provides a first light-sensitive area 24a an optical thin film 24b and an absorption film 24c. The light-sensitive area 24a, formed on an axis X, absorbs the light entered therein and generates a photocurrent corresponding to a magnitude of the incident light. The optical thin film 24b is formed on point in the surface of the light-receiving device 24 where the axis X intersects the axis Y. This optical thin film 24b reflects a portion of the light with the first wavelength incident from the light-emitting device 20, and transmits a portion of the light with the second wavelength propagated from the optical fiber 100. The thin film 24b may be a multi layered film made of first material with relatively low refractive index, such as silicon oxide, SiO2, or magnesium fluoride, MgF2, and second material with relatively high refractive index such as aluminum oxide, Al2O3, or titanium oxide, Ti2O5, alternately stacked to each other. The reflection at this optical thin film 24b may optically couple the first facet 20a of the light-emitting device with the first surface 14a of the lens 14, while, the transmission thereof may optically couple the first surface 14a of the lens 14 with the first light-sensitive area 24a of the light-receiving device 14.

That is, as shown in FIG. 3, a portion of the light L1 emitted from the first facet 20a of the light-emitting device 20 enters the tip 100a of the optical fiber 100 reflected by the optical thin film 24b to become the light L12 and passing through the lens 14. On the other hand, a portion L22 of the light L2 with the second wavelength emitted from the tip 100a of the optical fiber 100 enters the light-sensitive area 24a of the light-receiving device 24.

Thus, the optical assembly 10 optically couples the optical fiber 100 with the light-emitting device 20 and the light-receiving device 24 via the single lens 14. Moreover, the light-receiving device 24 provides the optical thin film 24b on the surface thereof, which may omit the optical filter as an independent optical element. Accordingly, the optical assembly 10 may facilitate the optical alignment between the light-emitting device 20, the lens 14, and the light-receiving device 24.

Around the optical thin film 24b is provided with the absorption film 24c, as shown in FIG. 3, to absorb the stray light within the housing 12. The absorption film 24c may be made of epoxy resin containing the carbon. This absorption film 24c may prevent the stray light from entering the light-sensitive area 24a of the light-receiving device 24.

Figure 4:
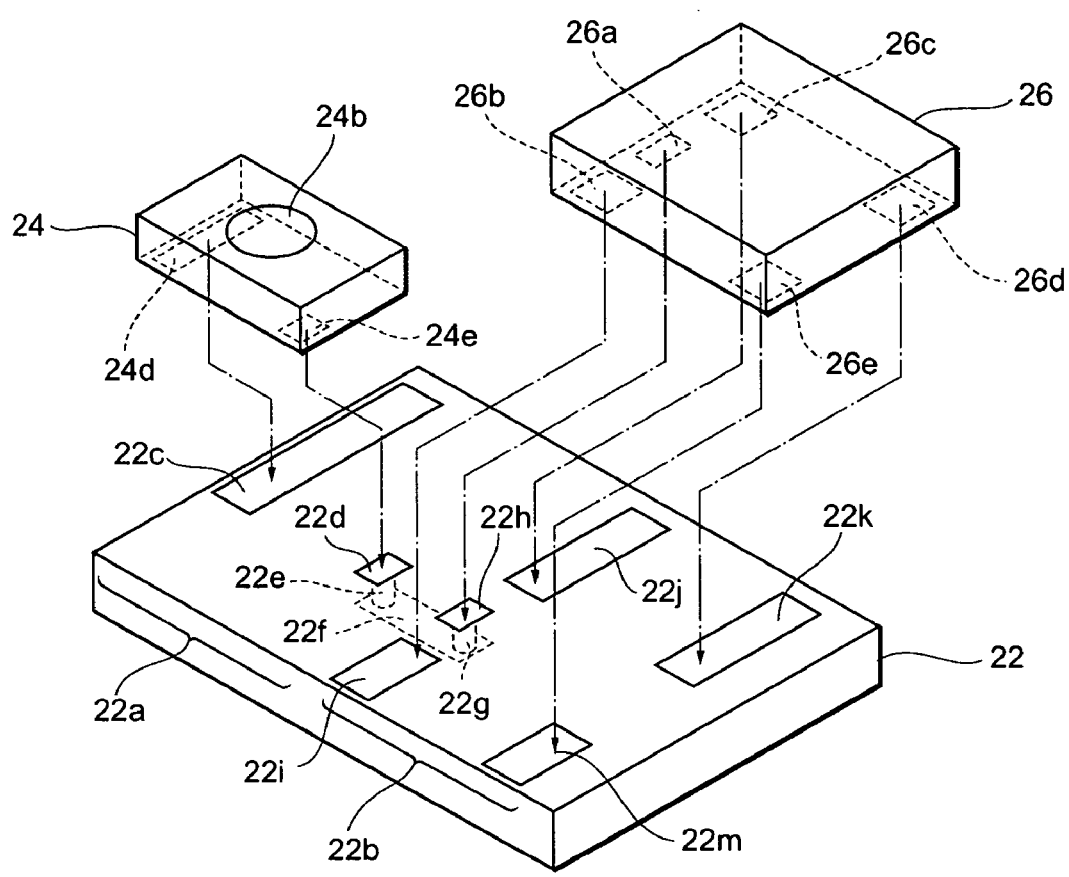
FIG. 4 is a perspective view showing the light-receiving device, the pre-amplifier, and the sub-mount according to the first embodiment of the invention.

Next, FIG. 4 is a perspective view showing the light-receiving device 24, the pre-amplifier 26, and the sub-mount 22 mounting these devices thereon. As shown in FIG. 4, the light-receiving device 24 includes first and second electrodes, 24d and 24e. The first electrode 24d is provided for applying a reverse bias voltage thereto, while, the second electrode 24e is for extracting the photocurrent therefrom.

The sub-mount 22 may be made of ceramics with first and second areas, 22a and 22b, on a primary surface thereof. The first area 22a mounts the light-receiving device 24 with the flip-chip technique, while, the second area 22b mounts the preamplifier 26 with the same technique. The first area 22a also provides first and second pads, 22c and 22d, the latter of which is formed along the boarder between the first and second areas, 22a and 22b, while, the former 22c of which is formed along an edge in the first area 22a opposite to the boarder. The pad 22c is electrically connected to the first electrode 24d of the light-receiving device 24, namely, wire-bonded with the lead terminal 32f with a bonding wire 36c. The bias voltage supplied from the lead terminal 32f is applied to the light-receiving device 24 via the bonding wire 36c, the pad 22c, and the first electrode 24d.

The other pad 22d on the sub-mount 22 is electrically connected to the second electrode 24e of the light-receiving device 24. This pad 22d is electrically connected to a pad 22h in the second area 22b via the via hole 22e, the interconnection 22f, and another via hole 22g. This pad 22h in the second area 22b is formed in the boarder area between the first and second areas, 22a and 22b. Accordingly, the interconnection 22f between the pads 22d and 22h may be shortened. The pad 22h is electrically connected to an electrode 26a of the pre-amplifier 26. Accordingly, the photocurrent generated in the light-sensitive area 24a is conducted to the pre-amplifier 26 through the second electrode 24e, the pad 22d, the via hole 22e, the interconnection 22f, the via hole 22g, and the pad 22h.

The interconnection 22f extends along a direction intersecting the bonding wires, 36a and 36b, that supply the driving current to the light-emitting device 20, and is buried within the sub-mount 22, which reduces the mutual inductance between the interconnection 22f and the bonding wires, 36a and 36b. Accordingly, this configuration may suppress the electro-magnetic induced noise due the driving current with a large magnitude flowing in the bonding wires, 36a and 36b, from affecting the photocurrent with a faint magnitude generated in the light-sensitive area.

On the second area 22b is formed with pads, 22i to 22m, in addition to the pad 22h, while, the pre-amplifier 26 provides, in addition to the electrode 26a, a plurality of electrodes, 26b to 26e. The electrode 26b for the ground electrode is connected to the pad 22i that is wire-bonded to the ground lead terminal 32c with a bonding wire 36d. The electrode 26c, for supplying the power supply for the pre-amplifier 26, is connected to the pad 22j that is wire-bonded to the lead terminal 32g with a bonding wire 36e. The electrode 26d is for outputting a monitoring signal with a positive phase derived from the photocurrent generated in the light-sensitive area 24a. The electrode 26d is connected to the lead terminal 32h via the pad 22t on the sub-mount 22 and the bonding wire 36f. The electrode 26e is, for outputting a monitoring signal with a negative phase derived from the photocurrent, connected to the lead terminal 32d via the pad 22m on the sub-mount 22 and the bonding wire 36g.

Referring to FIGS. 1 and 2 again, the third surface 16c of the bench 16 extending along a plane intersecting the axes X and Y faces the second facet 20b of the light-emitting device 20. This third surface 16c mounts the second light-receiving device 28 whose anode electrode 28a is connected to the lead terminal 32e with a bonding wire 36h, while a cathode electrode thereof 28b is grounded by directly connecting with the bench 16 with a bonding wire 36i. This second light-receiving device 20 monitors light emitted from the second facet 20b of the light-emitting device 20 and outputs the monitored signal to the lead terminal 32e.

The bench 16 also provides the fifth surface 16e intersecting the third surface 16c between the first and third surfaces, 16a and 16c, which facilitate to align the second light-receiving device 28 with the light-emitting device 20 by abutting the edge of the light-receiving device 28 against the third surface 16e.

Second Embodiment

Figure 5:
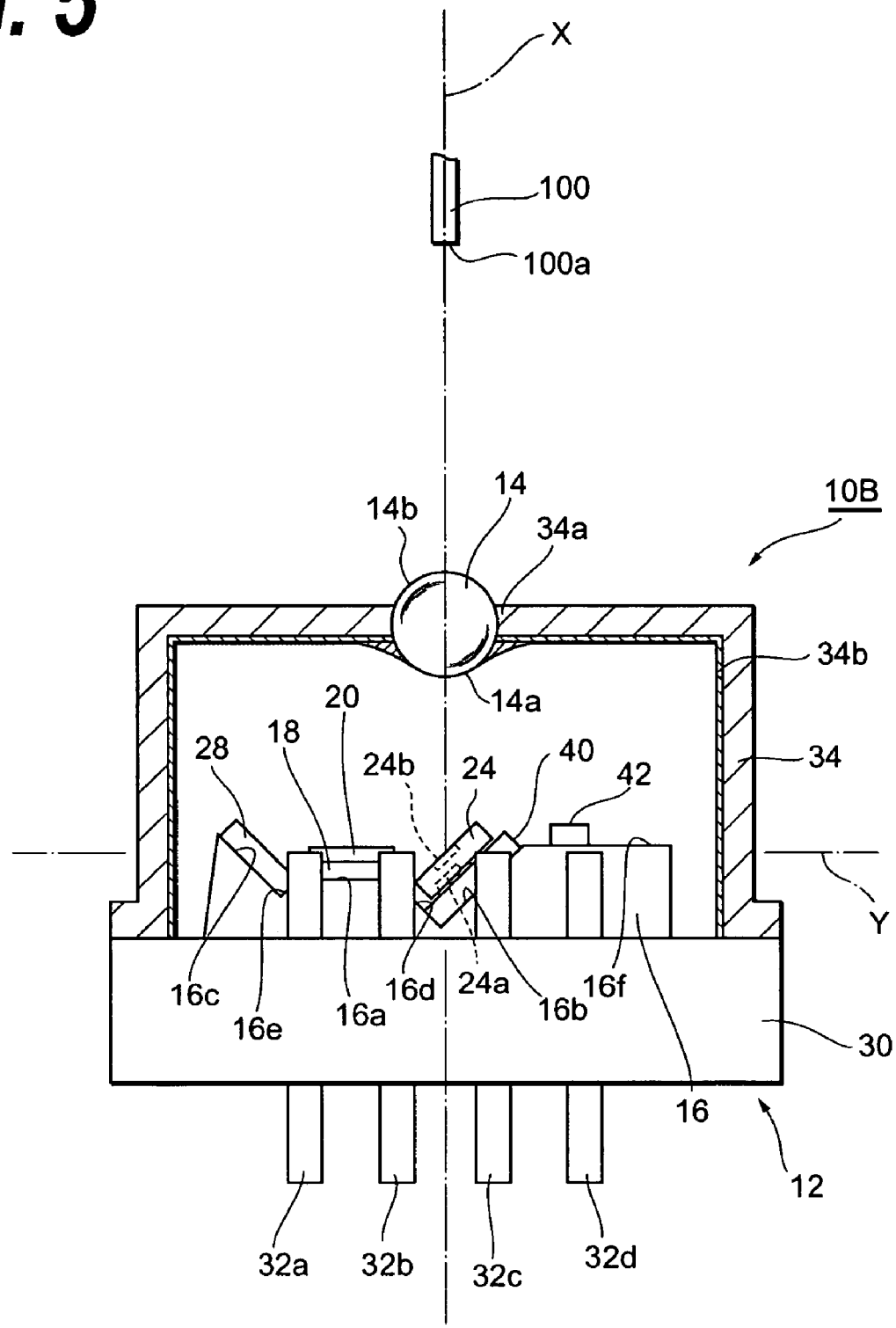
FIG. 5 is a side view of the optical assembly according to the second embodiment of the invention.
Figure 6:
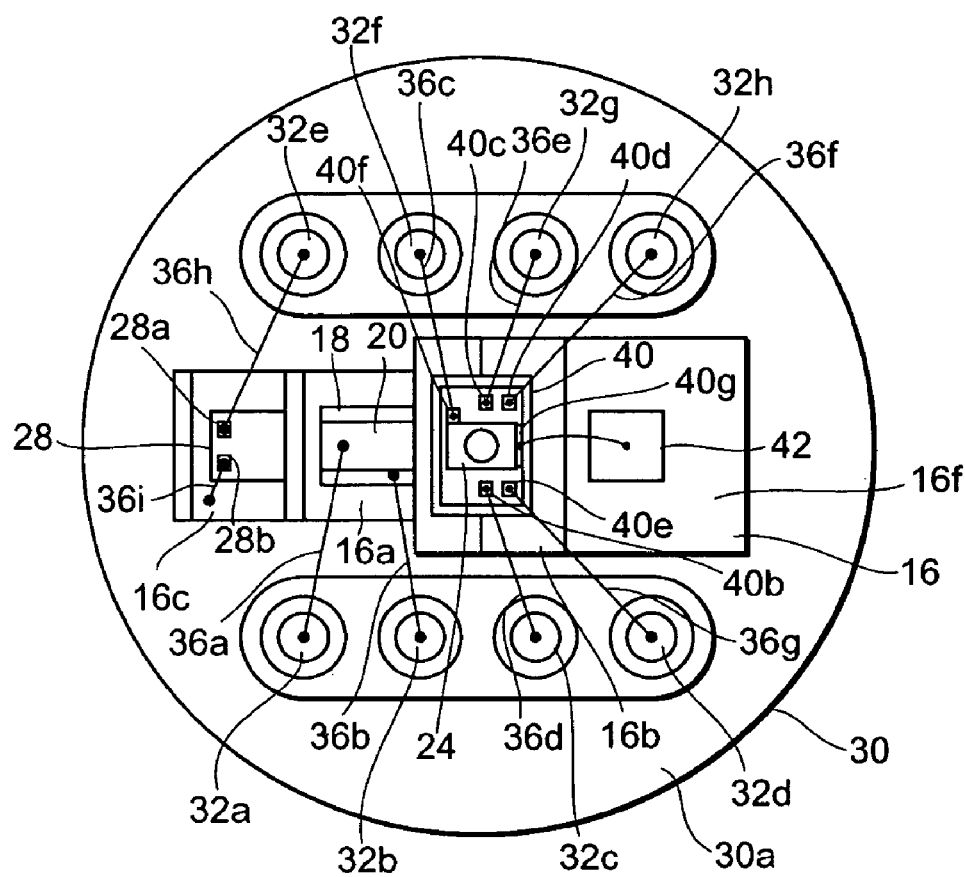
FIG. 6 is a plan view of the optical assembly shown in FIG. 5.

FIG. 5 is a side view, partially broken to illustrate the inside, of an optical assembly according to the second embodiment of the invention, and FIG. 6 is a plan view thereof. Next, the optical assembly 10B of the second embodiment will be described as comparing the first embodiment.

The optical assembly 10B shown in FIGS. 5 and 6 provides a pre-amplifier 40 instead of the pre-amplifier 26 in the first embodiment 10. This pre-amplifier 40 is mounted on the second area 16b of the bench. In this embodiment, the pre-amplifier 40 mounts the light-receiving device 24 thereon.

Figure 7:
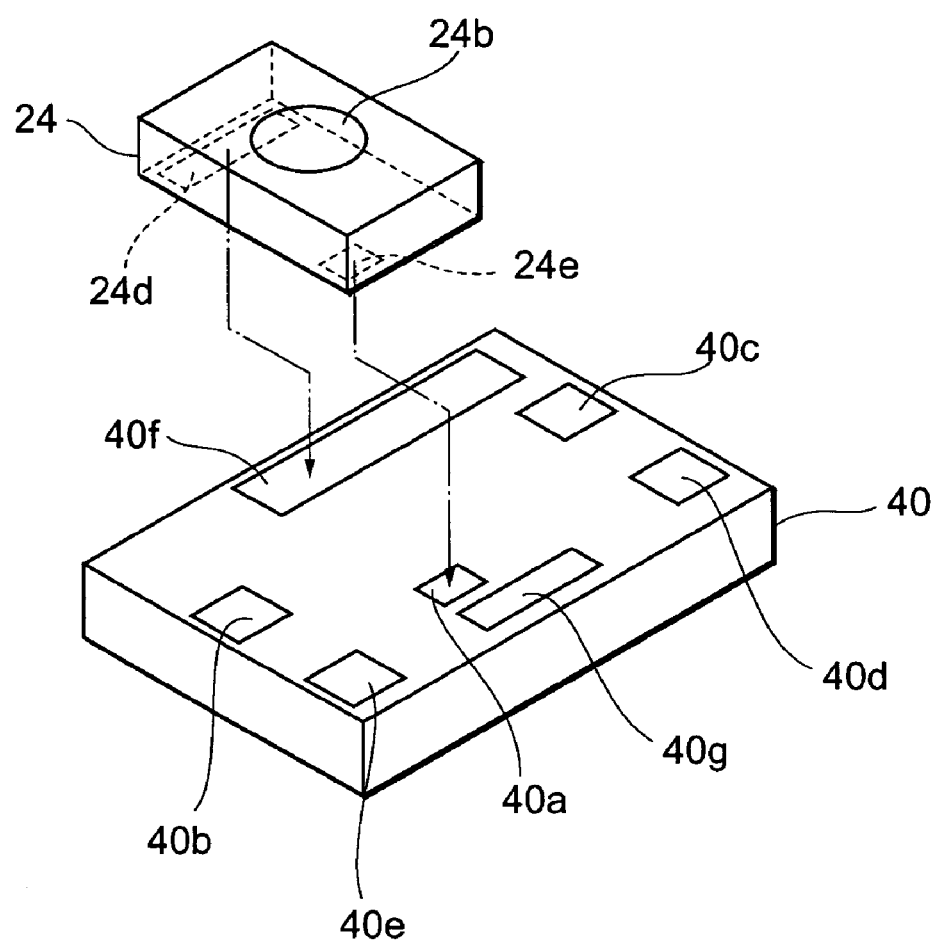
FIG. 7 schematically shows the optical arrangement of the light-receiving device and the pre-amplifier according to the second embodiment of the invention.

FIG. 7 is a perspective view of the optical assembly 10B of the second embodiment. Specifically, the pre-amplifier 40 provides a plurality of electrodes, 40a to 40g, in the upper surface thereof. The electrode 40f is connected to the lead terminal 32f with a bonding wire 36c for receiving the bias voltage. The electrode 40f is also connected to the first electrode 24d of the light-receiving device 24. The electrode 40a is for receiving the signal and connected to the second electrode 24e of the light-receiving device 24.

The electrode 40b is connected to the ground lead terminal 32c with a bonding wire 36d, while, the electrode 40c, for receiving the power supply therefore, is connected to the lead terminal 32g with a bonding wire 36e. The electrode 40d, for outputting the monitoring signal in the positive phase, is connected to the output lead 32h with a bonding wire 36f, while, the other electrode 40e, for outputting the monitoring signal in the negative phase, is connected to the other output lead terminal 32d with a bonding wire 36g. The electrode 40g is the ground electrode and is connected to the bench 16 via a capacitor 42 mounted on the fourth surface 16f of the bench 16.

According to this optical assembly 10B, the light-receiving device 24 is mounted on the pre-amplifier 40 by the flip-chip technique. Accordingly, the electrical pass connecting the light-receiving device 24 with the pre-amplifier 40 may be shortened, thereby reducing the mutual inductance between this interconnection and wires, 36a and 36b and suppressing the influence of the large current flowing in the wires, 36a and 36b, on the faint photocurrent generated in the light-sensitive area 24a. Moreover, the pre-amplifier 40 mounts the light-receiving device 24 thereon. Accordingly, this optical assembly 10B may shrink a size of the housing 12 compared with the assembly 10 of the first embodiment.

Third Embodiment

Figure 8:
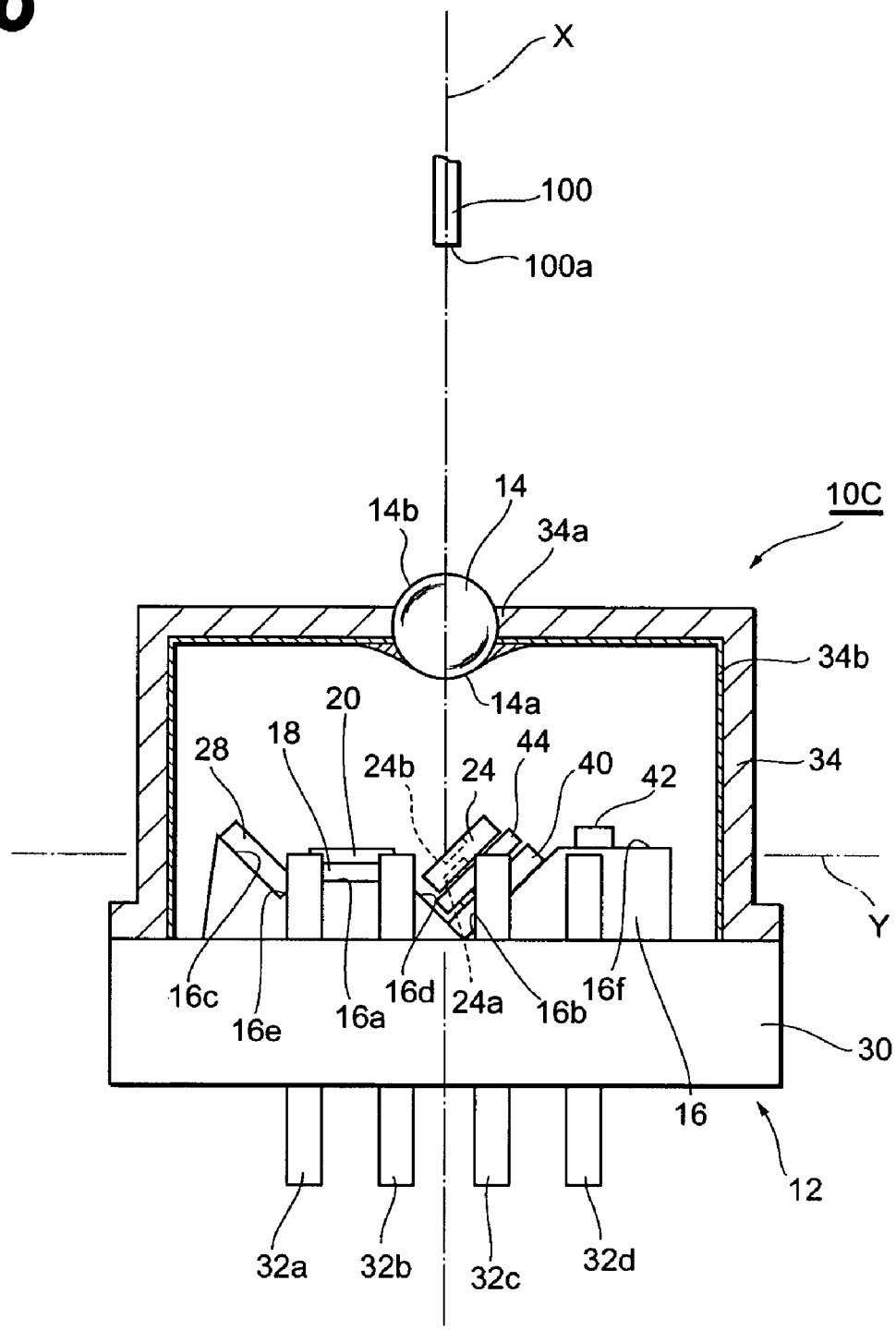
FIG. 8 is a side view of the optical assembly according to the third embodiment of the invention.
Figure 9:
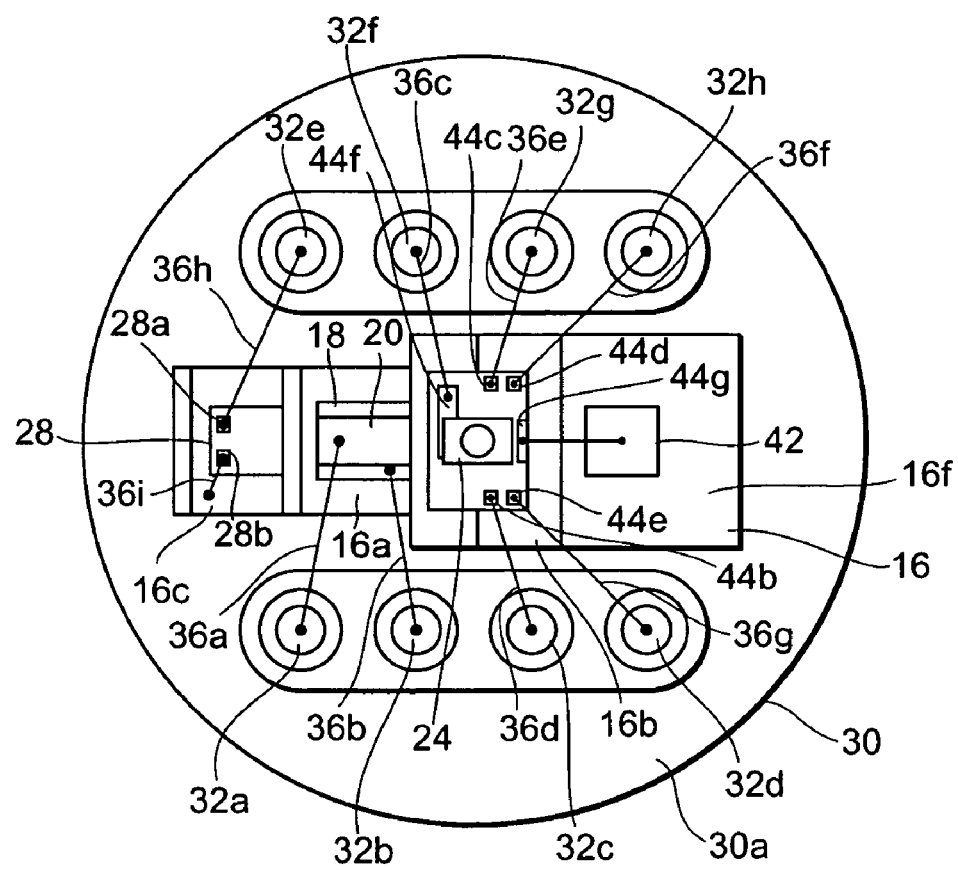
FIG. 9 is a plan view of the optical assembly shown in FIG. 8.

FIG. 8 is a side view of an optical assembly according to the third embodiment of the invention, and FIG. 9 is a plan view thereof. Next, the optical assembly 10c of the second embodiment will be described as comparing the first embodiment.

The optical assembly of the third embodiment 10c has a different arrangement from that of the second embodiment 10B in a sense that the pre-amplifier 40 mounts the light-receiving device 24 via a sub-mount 44 by the flip-chip technique. That is, the optical assembly 10c installs the light-receiving device 24 in an upper surface of the sub-mount 44, while, installs the pre-amplifier 40 in the other surface thereof 44

Figure 10:
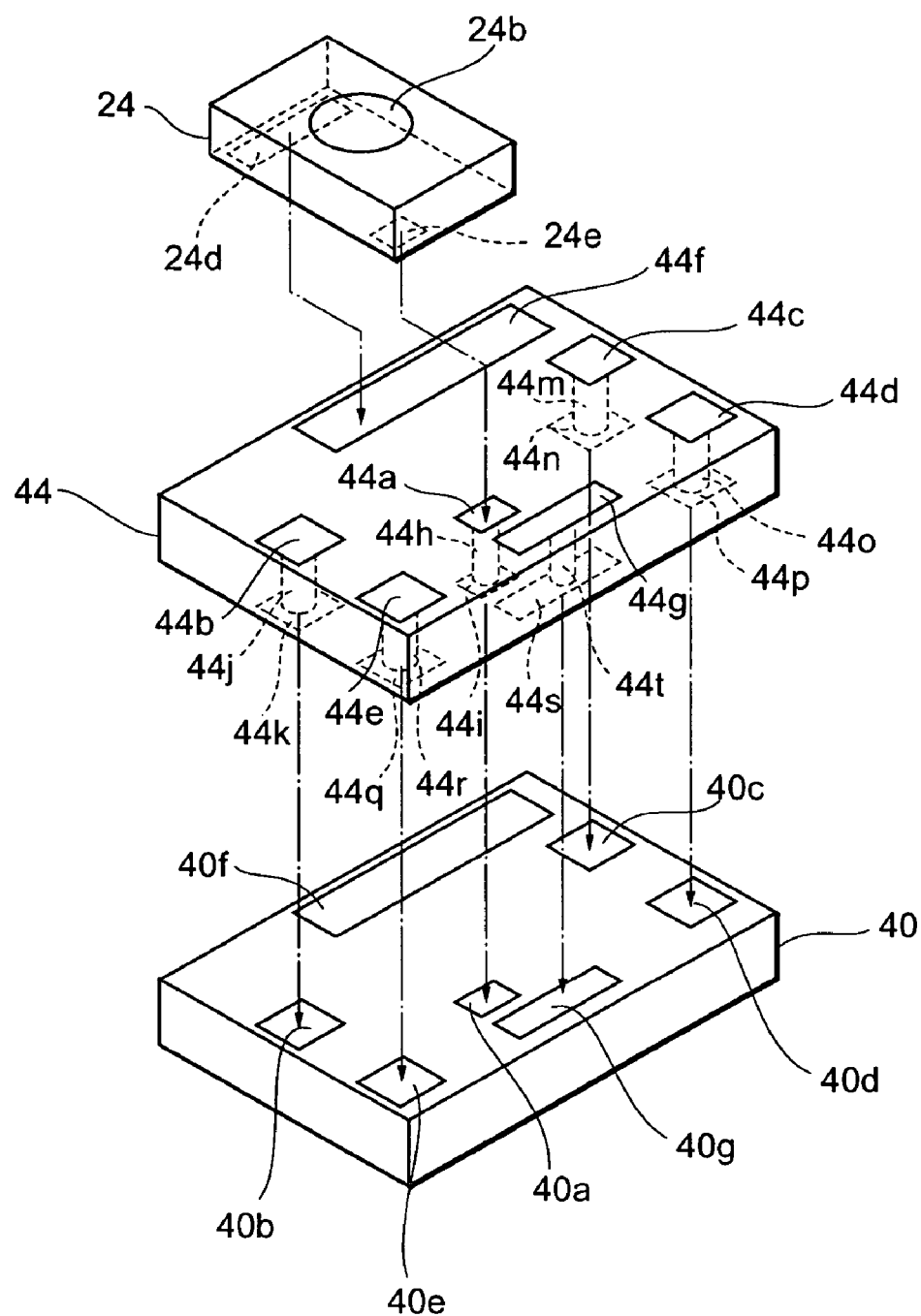
FIG. 10 schematically shows the optical arrangement of the light-receiving device, the pre-amplifier, and the sub-mount according to the third embodiment of the invention.

FIG. 10 is a perspective view of the third optical assembly 10c. As shown in FIG. 10, the sub-mount 44 mounts the light-receiving device 24 on the upper surface thereof and provides a plurality of pads, 44a to 44g, thereon. The pad 44f is electrically connected to the lead terminal 32f for receiving the bias voltage via a bonding wire 36c, and is also connected to the first electrode 24d of the light-receiving device 24. The pad 44a is connected to the second electrode 24e of the light-receiving device 24, to a pad provided in the other surface of the sub-mount 44 through the via hole 44h. This pad 44i is connected to the input electrode 40a of the pre-amplifier 40. Accordingly, the photocurrent generated in the light-sensitive area 24 is input to the pre-amplifier 40 via the second electrode 24e, the pad 44a, the via hole 44h, and the other pad 44i.

The pad 44b is connected to the ground lead terminal 32c via the bonding wire 36d, and is connected to the ground electrode 40b of the pre-amplifier 40 via the pad formed in the other surface of the sub-mount 44 and the via hole 44j. Thus, the ground electrode 40b of the pre-amplifier 40 is connected to the ground lead terminal via the pad 44k, the via hole 44j, the pad 44b, and the bonding wire 36d. The pad 44c is connected to the lead terminal 32g for receiving the power supply voltage with a bonding wire 36e, and is connected to the electrode 40c for inputting the power supply voltage via the pad 44n formed in the bottom surface of the sub-mount 44 and the via hole 44m connecting the top and bottom surfaces of the sub-mount 44.

The pad 44d is connected to the output lead 32h for the positive phase with a bonding wire36f, and is connected to the electrode 40d formed on the pre-amplifier 40 for outputting the monitoring signal with the positive phase via the pad 44p in the opposite surface of the sub-mount 44 and the via hole 44o connecting the top and bottom surfaces thereof. The pad 44e is connected to the output lead terminal 32h for the monitoring signal with the negative phase, and is connected to the electrode 40e of the pre-amplifier 40 for outputting the monitoring signal via the pad 44q in the bottom surface of the sub-mount 44 and the via hole 44r connecting the pad 44q and the pad 44e. The pad 44g is connected to the bench 16 via the capacitor 42 mounted on the fourth surface 16f of the bench 16. Here, the bench is grounded. Moreover, the pad 44g is connected to the electrode 40g on the pre-amplifier 40 for the ground via the pad 44s in the bottom surface of the sub-mount 44 and the via hole 44t connecting the top and bottom surfaces.

In the optical assembly 10B of the second embodiment, the pre-amplifier 40 forms the electrode for supplying the bias voltage for the light-receiving device 24, while, the optical assembly 10c according to the present embodiment provides the pad for supplying the bias voltage to the light-receiving device 24 in the sub-mount 44. Accordingly, the optical assembly 10c may be applicable a particular photodiode such as avalanche photo diode using relative high bias voltage.

Moreover, the optical assembly 10c provides the sub-mount 44 between the light-receiving device 24 and the pre-amplifier 40, accordingly, both devices may be designed independently.

Figure 11:
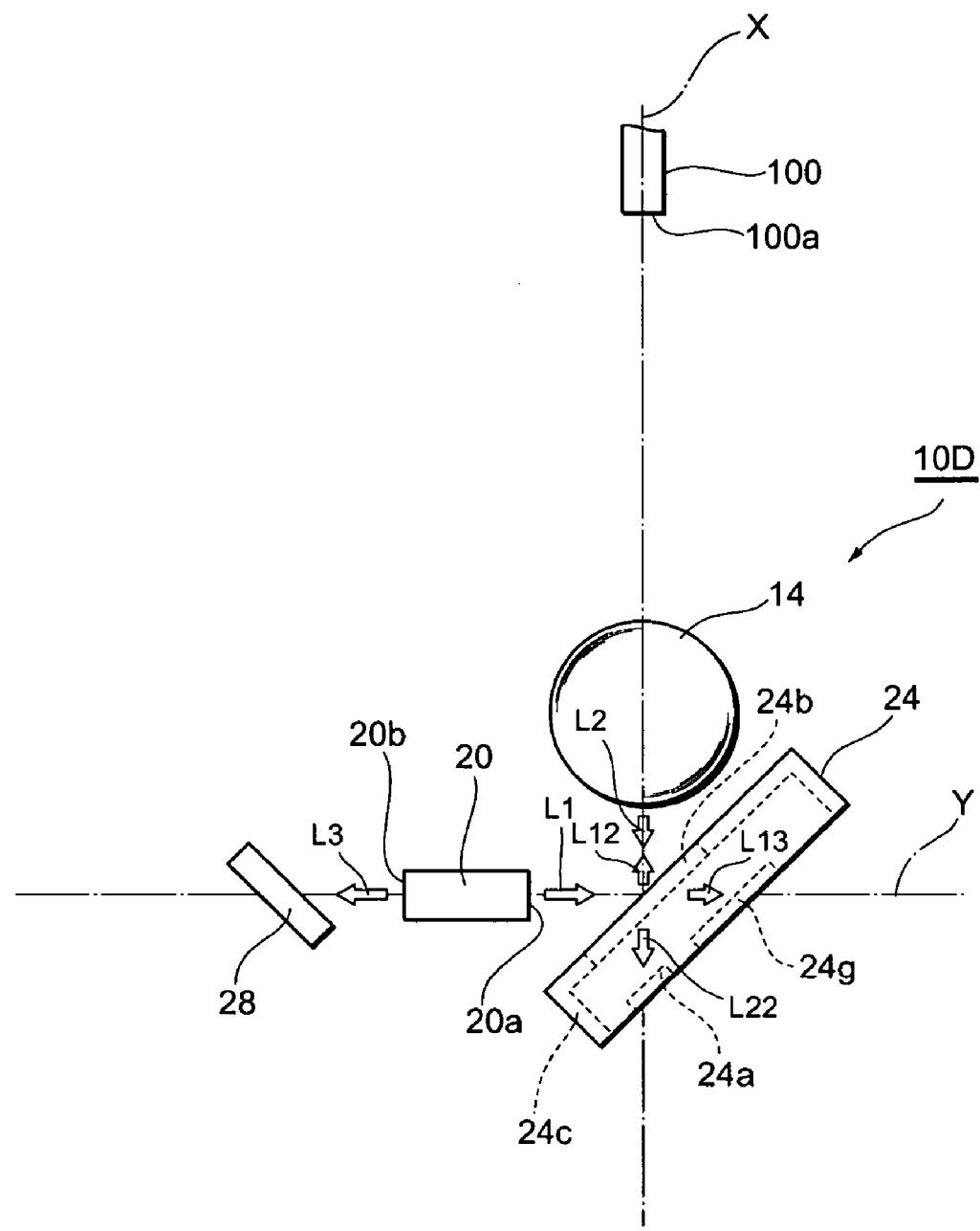
FIG. 11 schematically shows a modified embodiment of the invention.

The present invention, not restricted to embodiments described above, has various modifications. For example, FIG. 11 schematically illustrates a modification 10d of the present optical assembly. As shown in FIG. 11, the present optical assembly may provide a light-receiving device with another light-sensitive area 24g in addition to the area 24a. The light-receiving device 24 forms other light-sensitive area 24g on the axis Y and has the optical thin film 24b between this other area 24g and the first facet 20a of the light-emitting device 20. The additional sensitive area 24g receives light L13 that is a portion of light L1 emitted from the first facet 20a of the light-emitting device 20 and passing through the optical film 24b, and generates a photocurrent corresponding to a magnitude of the received light L13. This configuration according to the modified optical assembly 10d enables to monitor the magnitude of the front light emitted from the first facet 20a of the light-emitting device 20 in addition to monitor the back light emitted from the second facet 20b of the light-emitting device 20.

Figure 12:
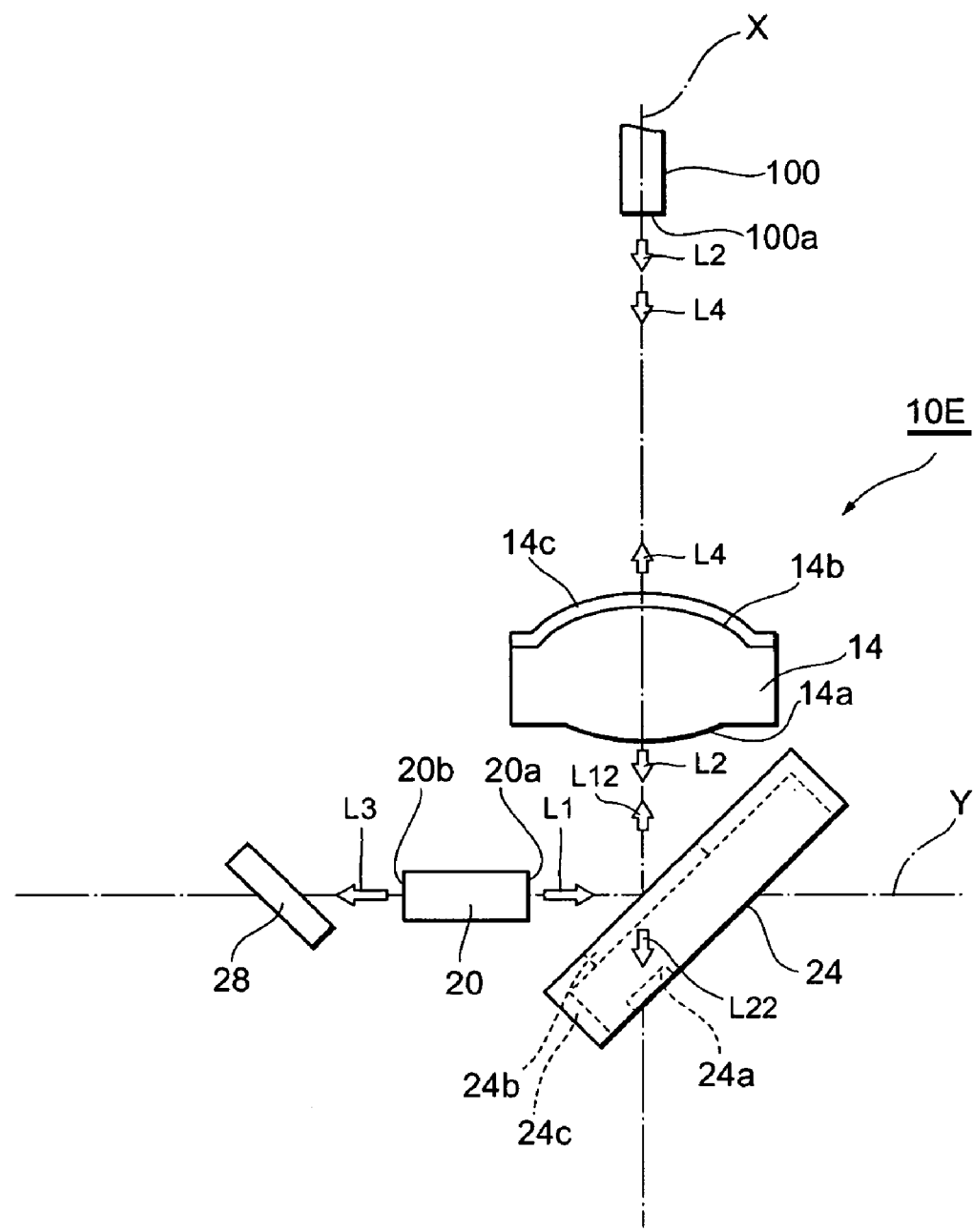
FIG. 12 schematically shows another modified embodiment of the invention.

FIG. 12 shows still another modification of the present invention. Embodiments described above provide a spherical lens 14. However, an a spheric lens may be applicable for an optical assembly 10 shown in FIG. 12. Moreover, the lens 14 may provide an anti-reflection coating 14c in the second surface 14b thereof. This anti-reflection coating 14c passes light with the first and second wavelengths, while reflects light with other wavelengths. For example, when the first and second wavelengths are for the transmission of digital signals, the other wavelength such as 1550 nm is for the analog transmission. According to the optical assembly 10e, the light L4 with the third wavelength emitted from the tip 100a of the optical fiber 100 may be reflected by the anti-reflection coating 14c. That is, the anti-reflection coating 14c prevents the light with the third wavelength from entering the assembly 10e, thereby suppressing the crosstalk between the light with the first or second wavelength and the light with the third wavelength.

I claim:

1. An optical assembly comprising:
    a light-emitting device for emitting light with a first wavelength along a first direction;
    a light-receiving device having a light-sensitive area and an optical thin film configured to reflect the light emitted from the light-emitting device to a second direction substantially in perpendicular to the first direction and to transmit light with a second wavelength coming from the second direction to the light-sensitive area;
    a bench with an area where the light-receiving device is mounted thereon;
    a stem with a primary surface where the bench is installed thereon, the area of the bench being inclined to the primary surface of the stem such that the second direction is substantially in perpendicular to the primary surface of the stem;
    a pre-amplifier for amplifying a signal generated in the light-receiving device;
    a bonding wire for supplying a driving current to the light-emitting device; and
    an interconnection for connecting the light-receiving device with the pre-amplifier,
    wherein the bonding wire and the interconnection extend along directions substantially in perpendicular to each other.

2. The optical assembly according to claim 1,
    wherein the light-receiving device further includes an absorption film in a peripheral region of the optical thin film, the absorption film absorbing the light with the first wavelength entering from the light-emitting device and the light with the second wavelength coming from the second direction.

3. The optical assembly according to claim 1,
    wherein the light-receiving device further includes another light-sensitive area for receiving the light with the first wavelength.

4. The optical assembly according to claim 1,
    further providing a lens with a first surface optically coupled with the optical thin film and a second surface opposite to the first surface, at least one of the first and second surfaces to be provided with a reflection film for reflecting light with wavelengths different from the first and second wavelengths.

5. The optical assembly according to claim 1,
    wherein the bench further mounts the light-emitting device thereon such that the first direction is substantially in parallel to the primary surface of the stem.

6. The optical assembly according to claim 5,
    wherein the pre-amplifier is mounted on the bench and the light-receiving device is mounted on the pre-amplifier with a flip-chip configuration.

7. The optical assembly according to claim 6,
further including a sub-mount made of insulating material,
wherein the light-receiving device is mounted on the sub-mount with the flip-chip configuration and the sub-mount is mounted on the pre-amplifier with the flip-chip configuration.

8. The optical assembly according to claim 1,
further including a sub-mount,
wherein the light-receiving device is mounted on the bench via the sub-mount, and
wherein the interconnection is buried within the sub-mount.

9. An optical assembly comprising:
a light-emitting device for emitting light with a first wavelength along a first direction;
a light-receiving device having a light-sensitive area and an optical thin film configured to reflect the light emitted from the light-emitting device to a second direction substantially in perpendicular to the first direction and to transmit light with a second wavelength coming from the second direction to the light-sensitive area,
wherein the light-receiving device further includes an absorption film in a peripheral region of the optical thin film, the absorption film absorbing the light with the first wavelength entering from the light-emitting device and the light with the second wavelength coming from the second direction.

10. The optical assembly according to claim 9,
further providing a bench with an area where the light-receiving device is mounted thereon and a stem with a primary surface where the bench is installed thereon, and
wherein the area is inclined to the primary surface of the stem such that the second direction is substantially in perpendicular to the primary surface of the stem.

11. The optical assembly according to claim 10,
wherein the bench further mounts the light-emitting device thereon such that the first direction is substantially in parallel to the primary surface of the stem.

12. The optical assembly according to claim 9,
further including a pre-amplifier for amplifying a signal generated in the light-receiving device, a bonding wire for supplying a driving current to the light-emitting device, and an interconnection for connecting a light-receiving device with the pre-amplifier,
wherein the bonding wire and the interconnection extend along directions substantially in perpendicular to each other.

13. The optical assembly according to claim 11,
wherein the pre-amplifier is mounted on the bench and the light-receiving device is mounted on the pre-amplifier with a flip-chip configuration.

14. The optical assembly according to claim 12,
further including a sub-mount made of insulating material,
wherein the light-receiving device is mounted on the sub-mount with the flip-chip configuration and the sub-mount is mounted on the pre-amplifier with the flip-chip configuration.

15. The optical assembly according to claim 14, wherein the interconnection is buried within the sub-mount.

* * * * *